United States Patent [19]
Hodemaekers

[11] 4,188,625
[45] Feb. 12, 1980

[54] GAS DISCHARGE DISPLAY ARRANGEMENT

[75] Inventor: Andreas M. L. Hodemaekers, Eindhoven, Netherlands

[73] Assignee: U.S. Philips Corporation, New York, N.Y.

[21] Appl. No.: 873,732

[22] Filed: Jan. 30, 1978

[30] Foreign Application Priority Data

Feb. 18, 1977 [NL] Netherlands .......................... 7701799

[51] Int. Cl.² ............................................. G08B 21/00
[52] U.S. Cl. .................................... 340/642; 315/130; 340/653; 340/758; 350/333
[58] Field of Search ....................... 340/641, 642, 653; 315/130, 131, 133

[56] References Cited
U.S. PATENT DOCUMENTS

| | | | |
|---|---|---|---|
| 3,558,972 | 1/1971 | Arai | 340/642 |
| 3,801,975 | 4/1974 | Kitano | 340/642 |
| 3,828,334 | 8/1974 | Wallace | 340/642 |
| 3,943,500 | 3/1976 | Buchanan | 340/642 |
| 4,001,818 | 1/1977 | Radichel et al. | 340/653 |

*Primary Examiner*—David L. Trafton
*Attorney, Agent, or Firm*—Thomas A. Briody; William J. Streeter; Bernard Franzblau

[57] ABSTRACT

A display device comprising a plurality of multi-segmented gas discharge display elements each with a common anode and a cathode for each segment in combination with an error detection circuit that signals the failure of one or more segments to ignite.

13 Claims, 7 Drawing Figures

GAS DISCHARGE DISPLAY ARRANGEMENT

The invention relates to a gas discharge display arrangement having a plurality of symbol display segments, which display segments have a common anode and separate cathodes, the display arrangement comprising a plurality of cathode drivers which couple the cathodes to a cathode supply source, a selection circuit and an error detection circuit having an error signal output for an electric fault signal.

Such display arrangements can inter alia be used in measuring devices instead of the customary mechanical pointers or counters.

U.S. Pat. No. 3,943,500 discloses inter alia a display arrangement of the abovementioned type in which digital display patterns can be produced for showing quantity or price of commodities, an error indication being given at the same time if one or more energized display segments fail to ignite.

To that end, the display arrangement disclosed in U.S. Pat. No. 3,943,500 mentioned above comprises a plurality of cathode drivers which can energize the respective cathodes of the display segments.

If a selected display segment refuses to ignite, this error is in many cases not detected by, for example, the customer or salesman because the incomplete representation of the desired digit is often identical or almost identical to another digit. To be able to detect this error, an error detection circuit is provided and comprises a plurality of diodes whose cathodes are connected to the cathodes of corresponding display segments and whose anodes are connected to a plurality of inputs of a detector circuit having an error signal output for an electric error signal. If an energized display segment fails to ignite the cathode voltage of this display segment is no longer determined by the anode supply voltage reduced by the operating voltage of a display segment and thus attains such a low voltage value that the diode associated with this cathode becomes conducting and takes over the current from the cathode driver. The detector circuit detects the occurrence of this diode current and consequently delivers an electric error signal at the error signal output of the error detection circuit. This circuit requires an additional diode for each cathode of a display segment. Furthermore the error detection circuit does not respond if an aged display segment draws a current which is much too low at an otherwise normal or substantially normal operating voltage, as may happen with gas discharge display elements.

According to the present invention there is provided a gas discharge display arrangement comprising a plurality of symbol display elements, each having a plurality of display segments, which display segments have a common anode and separate cathodes, a plurality of cathode drivers which couple the cathodes to a terminal for connection to a cathode supply source, a selection circuit and an error detection circuit including an error signal output for an electric error signal, a measuring circuit having a plurality of energizing signal outputs for electric energizing signals and a measuring signal output for an electric measuring signal, each energizing signal output of the measuring circuit being coupled to an energizing signal input of a corresponding cathode driver and the measuring signal output being coupled to the error signal output of the error detection circuit, the amplitude of an output of the electric measuring circuit being a measure of the sum of the amplitudes of the electric energizing signals applied by the measuring circuit to the cathode drivers, the amplitude of an energizing signal at a selected display segment being a function of the amplitude of the current through this display segment.

The present invention also relates to an apparatus including a gas discharge display arrangement in accordance with the present invention.

This arrangement in accordance with the present invention has the surprising effect that an increased protection is obtained because the error detection circuit reacts on another part or the cathode driver circuit whereas, compared to the circuit described in U.S. Pat. No. 3,943,500, it requires fewer components. Because the energizing current taken up by the cathode driver is measured and this energizing current depends on the value of the current through the energized display segment it is not only possible to detect whether the selected display segment is ignited or fails to ignite but also whether, with an ignited display segment, a minimally required value of the display current is exceeded by this display segment.

In addition it is desirable to check in certain cases whether one or more display segments ignite wrongly or remain ignited owing to a defect in the circuit. The error detection circuit in one embodiment of a display arrangement in accordance with the invention comprises a comparison circuit having a plurality of first signal inputs for electric input signals, a plurality of second signal inputs for electric input signals and a comparison signal output for an electric comparison signal, each first signal input being coupled to a corresponding cathode of a display segment, each second signal input being coupled to one output of a plurality of comparison voltage sources and the comparison signal output being coupled to the error signal output of the error detection circuit.

Selection signal outputs of the selection circuit can, for example, be used for the comparison voltage sources.

If the display arrangement must show identical information in two places, for example at the front and at the back of a weighing scale, the comparison voltage sources can be constituted by corresponding cathodes of another corresponding symbol display element. As soon as the corresponding display segments of two corresponding symbol display elements furnish display patterns which differ from one another, the comparison circuit will indicate an error. This solution is cheaper than would be the case where each of the groups of symbol display elements is compared against the selection signals with each having a comparison circuit of its own.

As in general the voltage differences at the cathodes of the display segments amount to some tens of volts and a standard construction with lower values for the required input voltages is preferably used for the comparison circuit, the coupling of the cathodes of the display segments to the first or second signal inputs of the comparison circuit should comprise a voltage level conversion. Accordingly one embodiment of a display arrangement in accordance with the invention comprises a plurality of resistor potentiometers each of which couples a cathode of a display segment to a corresponding first or second signal input of the comparison circuit, one side of each resistor potentiometer being connected to a corresponding cathode and the other side of the resistor potentiometers being connected in common to a supply input of the comparison circuit tap of a resistor potentiometer is connected to a corresponding signal input of the comparison circuit.

If the display arrangement comprises more than one symbol display element it is expensive to provide all display segments individually with a cathode driver and to select it with a correspondingly enlarged selection circuit. To avoid this problem the display arrangement in accordance with the invention may include an anode selection circuit for energizing cyclically and in turn the common anodes of the display segments of the corresponding symbol display elements. The cathodes of corresponding display segments of the various symbol display elements are then interconnected group-by-group, each group of interconnected cathodes being coupled to the cathode supply source by a cathode driver.

The various symbol display elements may be operated in a so-called time-division multiplex manner. If the alternating selection of the anodes is done at a sufficiently high frequency a picture is obtained which appears to be full and stationary to the human eye.

In this case an additional risk of errors is created in the event of a short-circuit between two or more of the anodes. Such an error may be detected in a particularly simple manner by means of a potentiometer circuit which supplies an error signal as soon as two or more anodes are wrongly energized simultaneously.

To measure the display current a cathode driver may include a driver transistor whose base current is supplied by the measuring circuit. If a selected display segment does not ignite, the amplitude of the base current will be about equal to that of the desired display current. Even if a great number of cathode drivers are energized by a measuring circuit the sum the currents to be delivered by this measuring circuit will increase significantly if a selected display segment does not ignite, as a desired display current has an amplitude which is equal to the normal base current multiplied by the current gain factor of the driver transistor.

The present invention will now be explained and described, by way of example, with reference to the accompanying drawings, wherein.

Figure 1:
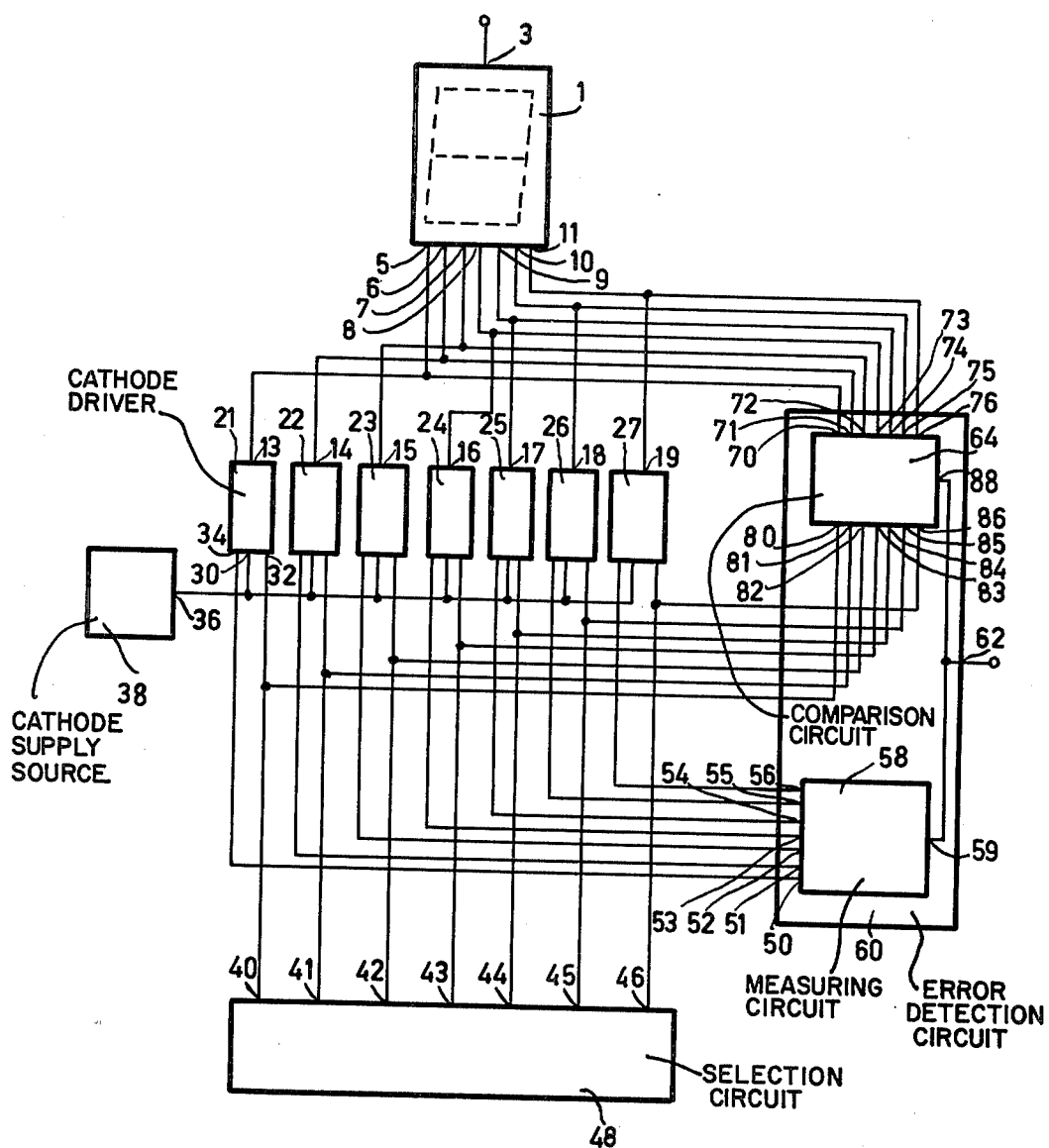
FIG. 1 is a simplified block schematic diagram of a display arrangement with a symbol display element.

FIG. 1 shows schematically a symbol display element 1 having seven display segments. An anode supply input 3 is connected to the common anode of the display segments and the cathodes thereof are connected to inputs 5 to 11 inclusive of the symbol display element 1. These inputs 5 to 11 inclusive are connected to outputs 13 to 19 inclusive, respectively, of a number of cathode drivers 21 to 27 inclusive, respectively, each having a supply input 30, a selection signal input 32 and an energizing signal input 34. The supply inputs 30 are connected together to the output 36 of a cathode supply source 38 which supplies a supply voltage, which is sufficiently negative relative to the anode voltage, to the cathode of the display segments.

The selection signal input 32 of the cathode drivers 21 to 27 inclusive are connected to selection signal outputs 40 to 46 inclusive, respectively, of a selection circuit 48.

The energizing signal inputs 34 of the cathode drivers 21 to 27 inclusive are connected to energizing signal outputs 50 to 56 inclusive, respectively, of a measuring circuit 58 having a measuring signal output 59. The circuit 58 is part of an error detection circuit 60 which has an error signal output 62. In addition, the error detection circuit 60 comprises a comparison circuit 64 having a number of first signal inputs 70 to 76 inclusive which are coupled to the outputs 13 to 19 inclusive, respectively, of the cathode drivers 21 to 27 inclusive, respectively, a number of second signal inputs 80 to 86 inclusive which are connected to the selection signal outputs 40 to 46 inclusive, respectively, of the selection circuit 48 and a comparison signal output 88. The comparison signal output 88 and the measuring signal output 59 are coupled to the error signal output 62 of the error detection circuit 60, which coupling is shown schematically only and will be described in detail later.

The display arrangement of FIG. 1 operates as follows.

An energizing current is supplied to all energizing signal inputs 34 of the cathode drivers 21 to 27 inclusive by the measuring circuit 58 and a selection signal is supplied to at least one of the selection signal inputs 32 by the selection circuit 48 such that, in the case of a properly functioning symbol display element, a display current is supplied to the selected display segments by the selected cathode driver so that the symbol display element, owing to the illumination of gas discharge paths which correspond to the selected display segments, displays a desired display pattern in the form of a symbol, for example, a digit. If so desired the circuit can be adapted to operate with symbol display elements having more or less display segments for displaying decimal points, character-symbols etc.

The amplitude of the display current is equal to the product of the amplitude of the energizing current and the current gain factor of the cathode driver. This current gain factor will preferably be at least 100.

The cathode drivers have the property that the energizing current increases to approximately the value of the desired display current if the output of the cathode driver cannot supply current, as is the case with a defective display segment or a defective connection of a display segment.

If the normal amplitude of an energizing current is A, the measuring circuit 58, depending on the selection signals, supplies a current having a maximum amplitude 7 A for seven-segment symbol display elements if all selected display segments operate properly.

If a selected display segment does not ignite, the measuring circuit 58 must supply a current whose amplitude is at least 100 A. The measuring circuit is arranged so that a measuring signal is produced at the measuring signal output 59 which is a logic "1" for a supplied current whose amplitude is below, for example 10 A and a logic "0" for greater currents.

Figures 4, 5, 6:
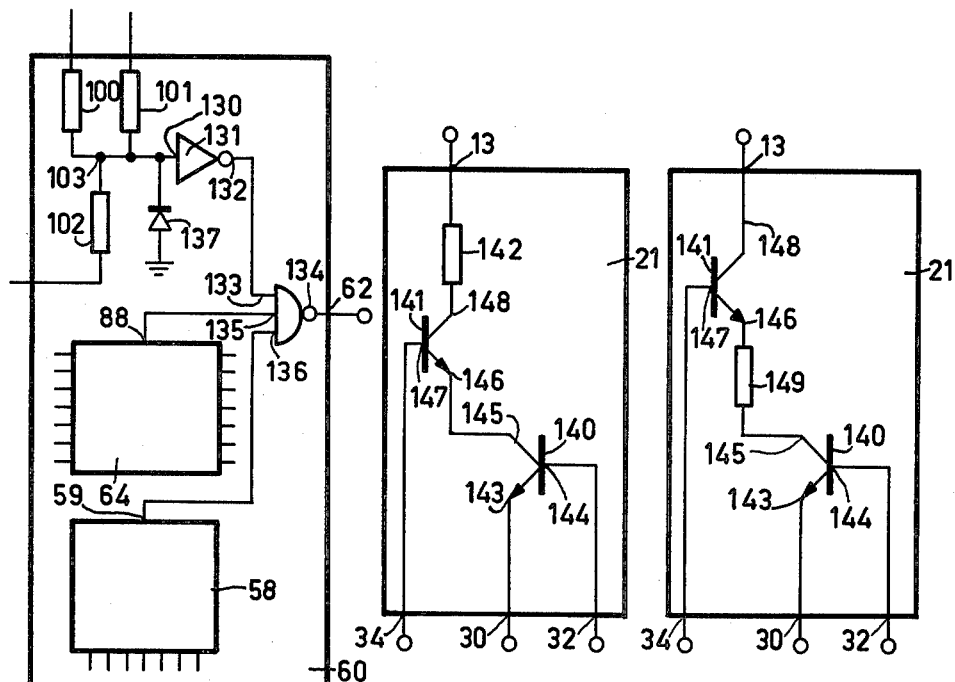
FIG. 4 is a block diagram of the coupling of the measuring signal output, the comparison signal output and an anode-short-circuit signal output to the error signal output of the error detection circuit.
FIG. 5 is a circuit diagram of an embodiment of a cathode driver.
FIG. 6 is a circuit diagram of a further embodiment of a cathode driver.
Figure 7:
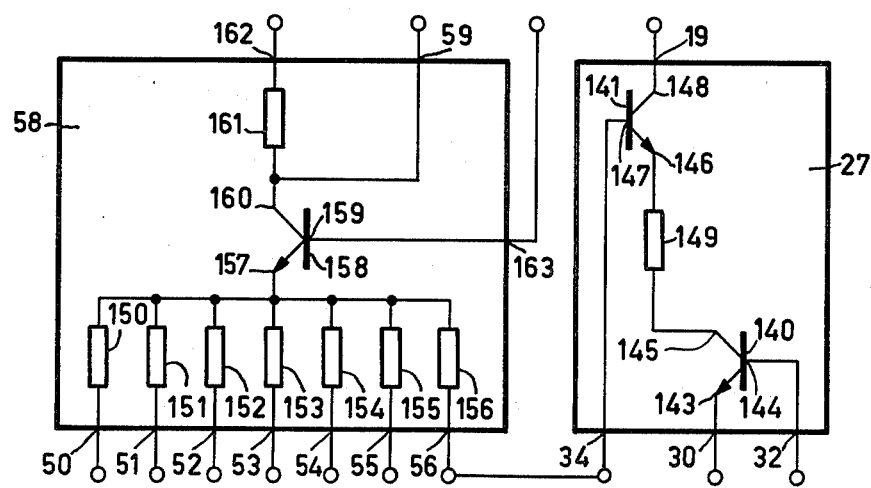
FIG. 7 is a circuit diagram of an embodiment of a measuring circuit.

For a description of some embodiments of cathode drivers and of the measuring circuit reference is made to discussion of the FIGS. 5, 6 and 7.

The value of the selection signals at the outputs 40 and 46 inclusive of the selection circuit 48 is compared by the comparison circuit 64 with the value of the signals at the cathode inputs 5 to 11 inclusive respectively of the display segments. If the respective values are equal two by two the comparison circuit 64 supplies a logic "1" to the comparison signal output 88. If an inequality occurs, for example because a non-selected display element is ignited, the comparison signal becomes "0".

As will be described with reference to FIG. 4 the measuring signal output 59 and the comparison signal output 88 are so coupled to the error signal output 62 of the error detection circuit 60 that the error signal at the error signal output is "0" for the time when no errors occur and "1" as soon as the measuring circuit 58 or the comparison circuit 64 detect an error.

An integrated circuit type HEF 4585 supplied by Philips Elcoma and functionally equivalent to the Signetics Corporation 5485/7485 may, for example, be used for the comparison circuit.

In the description of FIGS. 2 to 7 the same reference numerals will always be used for the same components.

Figure 2:
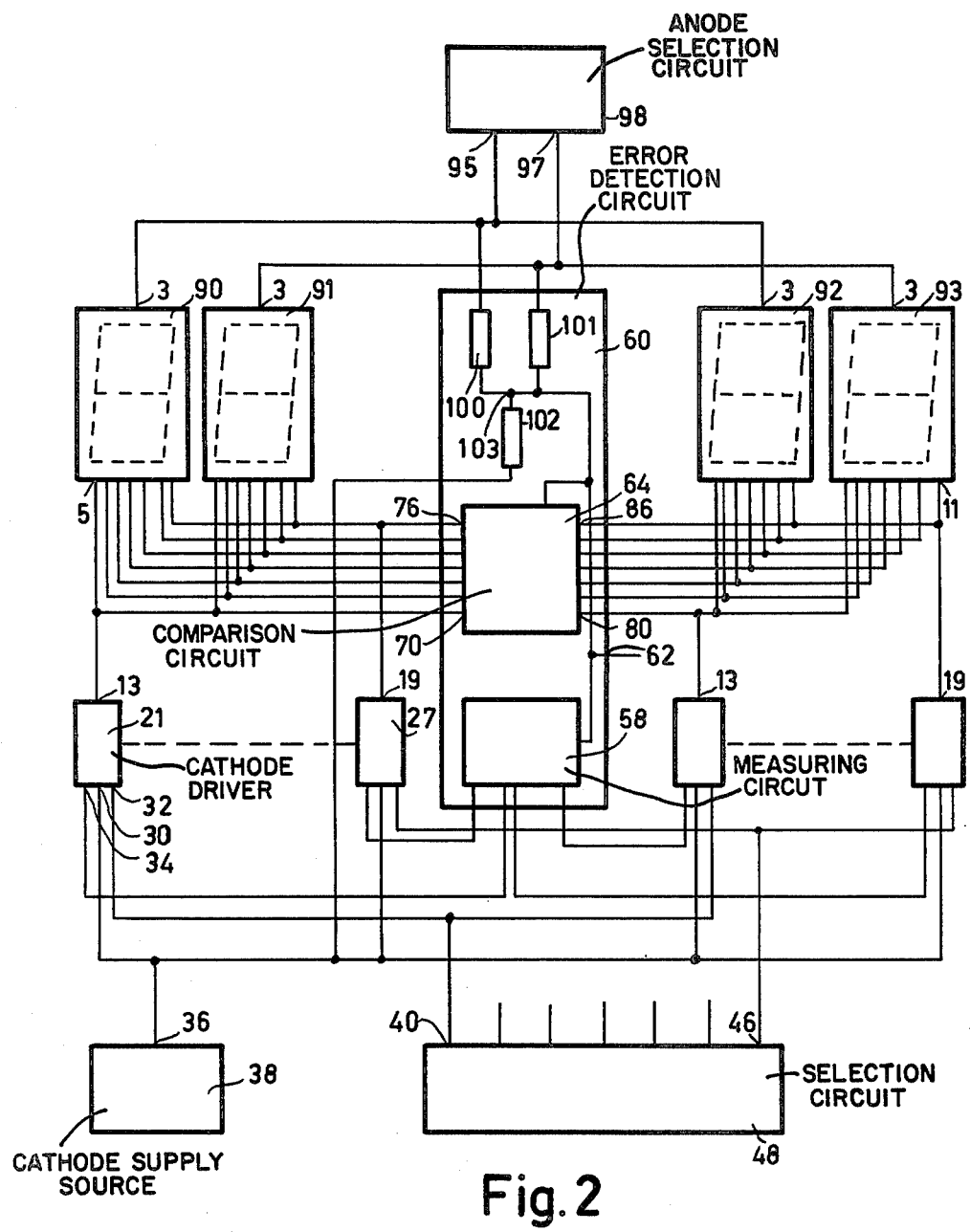
FIG. 2 is a simplified block schematic diagram of a display arrangement having a greater number of symbol display elements than in FIG. 1.

FIG. 2 shows a display device having two groups of symbol display elements, two of which, 90, 91 and 92, 93 respectively, are shown for each group. The anode supply inputs 3 of the symbol display elements 90, 92 are connected to an anode selection signal output 95 of an anode selection circuit 98 and the anode supply inputs 3 of the symbol display elements 91,93 are connected to an anode selection signal output 97 of the anode selection circuit 98. The anode selection circuit 98 alternately energizes the anodes of the symbol display elements 90 and 92 or 91 and 93 respectively.

In the groups 90,91 and 92,93, respectively, the identical cathode inputs 5 to 11 inclusive, respectively, are interconnected and connected to the outputs 13 to 19 inclusive, respectively, of the corresponding cathode drivers.

The selection circuit 48 supplies a combination of selection signals corresponding to a symbol which must be displayed by the symbol display elements 90 and 92 if the anode selection signal output 95 is energized and a signal combination corresponding to a symbol which must be displayed by the symbol display elements 91 and 93 if the anode selection signal output 97 is energized. When the sequence of the anode selection signals is sufficiently rapid, an apparently full and stationary pattern of symbols will be observed wherein the subpatterns of the two groups show mutually the same picture for the time no failures occur.

In all further respects the cathode drivers 21 to 27 inclusive and the measuring circuit 58 operate in the same manner as those of FIG. 1.

Also the operation of the comparison circuit 64 is the same as that of FIG. 1. Now, however, the signal states of the two cathode groups are compared versus one another. To this end the second signal inputs 80 to 86 inclusive are coupled to the cathode inputs 5 to 11 inclusive, respectively, of the cathodes of the second group of symbol display elements 92, 93. The comparison circuit 64 supplies a comparison signal "1" if the signal states in the groups are in agreement.

The error detection circuit 60 further comprises a potentiometer circuit comprising resistors 100, 101, 102. One side of the resistors 100 and 101, respectively, is connected to an anode selection signal output 95 and 97, respectively. The other side of the resistors 100, 101 are connected in common to one side of the resistor 102 whose other side is connected to the supply output 36 of the cathode supply source 38. The resistors are dimensioned such that the common junction 103 represents a logic "0" if one of the two groups of anodes is energized and a logic "1" when both groups are energized simultaneously, for example owing to a short-circuit between the anodes.

The junction 103 is coupled to the error signal output 62 of the error detection circuit 60 that the error signal also supplies a logic "1" as soon as the signal at the junction 103 represents a "1".

Figure 3:
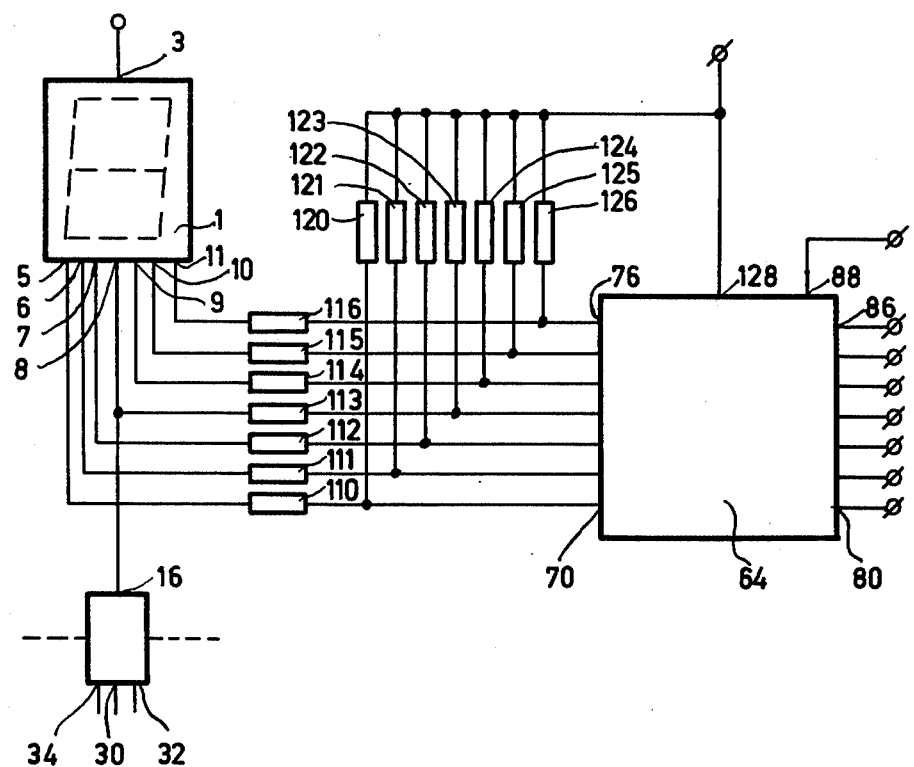
FIG. 3 is a simplified circuit diagram of the coupling between the cathodes of display segments and a comparison circuit.

FIG. 3 shows an embodiment of circuit for coupling the cathode inputs 5 to 11 inclusive to the first signal inputs 70 to 76 inclusive of the comparison circuit of FIG. 1. As the cathode voltages of non-selected and selected display segments mostly differ by some tens of volts a level conversion is required when a standard comparison circuit is used. To this end the display arrangement comprises a number of resistor potentiometers 110, 120 to 116, 126 inclusive, one side of the resistor potentiometers being connected to one of the cathode inputs 5 to 11 inclusive, respectively, and the other side being connected in common to a supply input 128 of the comparison circuit 64. The taps of the resistor potentiometers 110,120 to 116,126 inclusive are connected to the first signal inputs 70 and 76 inclusive, respectively, of the comparison circuit 64. The resistors are dimensioned so that a tap represents a logic "0" when the corresponding display segment has been selected and a "1" when it has not been selected.

For the circuit shown in FIG. 2 the coupling of the second group of cathodes to the second signal inputs 80 to 86 inclusive of the corresponding circuit 64 is performed in a corresponding manner.

FIG. 4 shows an embodiment of a circuit for coupling the junction 103, the measuring signal output 59 and the comparison signal output 88 to the error signal output 62 of the error detection circuit 60. The junction 103 is connected to an input 130 of an inverter circuit 131 having an output 132 which is connected to an input 133 of an inverting AND-gate circuit 134 (NAND-gate). The measuring signal output 59 is connected to an input 136 of this gate 134 and the comparison signal output 88 is connected to an input 135 of the same gate 134. The output of gate 134 constitutes the error signal output 62 of the error detection circuit 60.

In an error-free situation the junction 103 represents an "0" so that the output 132 of the inverter circuit is a "1", and the outputs 59 and 88 both represent also a "1". Then the output 62 of the gate 134 supplies an output signal "0". If an error is detected in one of the protection circuits then at least one of the inputs 133, 135, 136 of the gate circuit 134 will become "0" and the error signal output 62 will supply an error signal "1".

This error signal can be processed in various manners so that, in the case of a failure, for example the anode selection circuit is switched off or is switched off periodically at a low frequency, whereby the existence of an error is brought to the attention of the observer.

In this embodiment the junction 103 is connected to the cathode of a diode 137 the anode of which is connected to a chassis (ground) lead of the display arrangement. This prevents the input 130 of the inverter circuit 131 from becoming highly negative in the case of a switched-off anode selection.

FIG. 5 shows an embodiment of a cathode driver 21 which comprises a series arrangement of a transistor 140, a transistor 141 and a resistor 142. The emitter 143 of the transistor 140 is connected to the power supply terminal 30 of the cathode driver 21, the base 144 to the selection signal input 32, and the collector 145 to the emitter 146 of the transistor 141. The base 147 of transistor 141 is connected to the energizing signal input 34, the collector 148 to one side of the resistor 142, and the other side of the resistor 142 is connected to the output 13 of the cathode driver 21. The transistor 140 is used as a selection switch, the transistor 141 as a driver transistor and the resistor 142 as a current source for the corresponding display segment.

If this display segment is selected, the transistor 140 is rendered conductive and driven to full power. The transistor 141 receives a base current from the measuring circuit so that an amplified current is supplied as a display current to the cathode of the selected display segment through the resistor 142.

If this current is prevented from flowing because the display segment is defective or a connection interrupted, the base current of the transistor 141 will increase to a high value. This also happens if the display element does indeed ignite but, owing to ageing, has a display current which is much too low.

FIG. 6 shows a further embodiment of a cathode driver 21 which comprises a series arrangement of a transistor 140, a resistor 149 and a transistor 141. Relative to FIG. 5 the resistor and the transistor 141 have changed places, otherwise the connections are identical. The transistor 141 constitutes a current source circuit together with the emitter resistor 149. This has the advantage that the display current depends to a lesser degree on tolerance differences between the operating voltages of display segments. In all other respects the principle is identical to that of the circuit shown in FIG. 5.

FIG. 7 shows an embodiment of the measuring circuit 58. This measuring circuit comprises a number of resistors 150 to 156 inclusive, one side of which is connected to, in all cases, one of the energizing signal outputs 50 to 56 inclusive, respectively, and the other side in common to an emitter 157 of a transistor 158. A base 159 of transistor 158 is connected to a setting signal input 163 of the arrangement. A collector 160 is connected to one side of a resistor 161 and to the measuring signal output 59 of the measuring circuit. The other side of the resistor 161 is connected to a supply terminal 162 of the measuring circuit.

The measuring circuit operates as follows. A setting signal can be applied to the setting signal input 163. The emitter 157 of the transistor 158 attains a voltage value which is approximately equal to that of the setting signal so that a base current can be supplied through one of the resistors 150 to 156 inclusive to one of the transistors 141 of a cathode driver, for example driver 27, base current has a zero value if the cathode driver 27 is not selected and, consequently, the transistor 140 is cut-off. A low value of base current flows if the driver circuit 27 is selected and the corresponding display segment carries a normal display current, whereas a high value of base current flow if the display segment carries a display current which is much too low or if this segment is not ignited at all.

The collector resistor 161 of the transistor 158 carries the sum of the base currents supplied to all the cathode drivers and is dimensioned such that the measuring voltage at the measuring signal output 59 represents a "1" if this current sum has a low value and an "0" if this sum becomes abnormally high owing to a circuit defect.

In some cases it is desirable to implement the switching elements of, for example, cathode drivers and error detection circuits as part of one or more integrated circuits. In such an embodiment resistors and diodes can be implemented with transistors which are suitably connected to form a resistor or a diode.

What is claimed is:

1. A gas discharge display arrangement comprising a plurality of symbol display elements each having a plurality of display segments, said display segments having a common anode and separate cathodes, a plurality of cathode drivers which couple the cathodes to a terminal for connection to a cathode supply source, a selection circuit having a plurality of selection signal outputs respectively coupled to individual inputs of said cathode drivers, an error detection circuit including an error signal output for an electric error signal, a measuring circuit having a plurality of energizing signal outputs for electric energizing signals and a measuring signal output for an electric measuring signal, and means coupling each energizing signal output of the measuring circuit to an energizing signal input of a corresponding cathode driver and the measuring signal output to the error signal output of the error detection circuit, the amplitude of an output signal of the measuring circuit being a measure of the sum of the amplitudes of the electric energizing signals applied by the measuring circuit to the cathode drivers, the amplitude of an energizing signal at a selected display segment being a function of the amplitude of the current through this display segment.

2. A gas discharge display arrangement as claimed in claim 1, wherein the error detection circuit further comprises a comparison circuit having a plurality of first signal inputs for electric input signals, a plurality of second signal inputs for electric input signals and a comparison signal output for an electric comparison signal, means coupling each first signal input to a corresponding cathode of a display segment and each second signal input to one corresponding output of a plurality of comparison voltage sources, and means coupling the comparison signal output to the error signal output of the error detection circuit.

3. A gas discharge display arrangement as claimed in claim 2, wherein the comparison voltage sources comprise corresponding cathodes of another corresponding symbol display element.

4. A gas discharge display arrangement as claimed in claim 2 further comprising a plurality of resistor potentiometers, each potentiometer coupling a cathode of a display segment to a corresponding first or second signal input of the comparison circuit, means connecting one terminal of each resistor potentiometer to a corresponding cathode, means connecting the other terminals of the resistor potentiometers in common to a supply input of the comparison circuit, and means connecting a tap of a resistor potentiometer to a corresponding signal input of the comparison circuit.

5. A gas discharge display arrangement as claimed in claim 1 wherein the plurality of symbol display elements are formed into at least two groups of display elements with corresponding display elements in each of the groups, the arrangement further comprising means connecting together the common anodes of corresponding display elements of each of the groups of display elements, an anode selection circuit for energizing cyclically and in turn the common anodes of the display segments of the corresponding symbol display elements, the cathodes of corresponding display segments of the various symbol display elements being interconnected group-by-group with each group of the interconnected cathodes being coupled to the cathode supply source by a cathode driver.

6. A gas discharge display arrangement as claimed in claim 5, wherein the error detection circuit comprises a potentiometer circuit having a plurality of first resistors and a second resistor, means connecting one terminal of each first resistor to a different output of a plurality of selection signal outputs of the anode selection circuit, means connecting the other terminal of all said first resistors to one terminal of the second resistor, means connecting the other terminal of the second resistor to the terminal for connection to the cathode supply source, and means coupling the common junction of the first and the second resistors to the error signal output of the error detection circuit.

7. A gas discharge display arrangement as claimed in claim 6, wherein the error detection circuit includes a comparison circuit having first and second pluralities of inputs and a comparison signal output, means coupling the first plurality of inputs to corresponding cathodes of the display elements of a first group of display elements and the second plurality of inputs to corresponding cathodes of the display elements of a second group of display elements, a gate circuit, means connecting the measuring signal output of the measuring circuit, the comparison signal output of the comparison circuit and the junction of the first and the second resistors of the potentiometer circuit to corresponding signal inputs of the gate circuit, and means connecting an output of the gate circuit to the error signal output of the error detection circuit.

8. A gas discharge display arrangement, as claimed in claim 1 wherein each cathode driver comprises a series arrangement of a switch, a transistor and a resistor, means connecting one terminal of the switch to the terminal for connection to the cathode supply source and the other terminal of the switch to the emitter of the transistor, means connecting the collector of the transistor to one terminal of the resistor and the other terminal of the resistor to the cathode to be energized, means connecting the base of the transistor to the energizing signal input of the cathode driver, the transistor base current in the conducting state of the switch and with the display segment ignited being equal to the display current through the display segment divided by the current gain of the transistor and, if the display segment does not ignite, said base current being approximately equal to the desired display current.

9. A gas discharge display arrangement as claimed in claim 1 wherein each cathode driver comprises a series arrangement of a switch, a resistor and a transistor, means connecting one terminal of the switch to the terminal for connection to the cathode supply source and the other terminal of the switch to one terminal of the resistor, means connecting the other terminal of the resistor to the emitter of the transistor and the collector of the transistor to the cathode to be energized, means connecting the base of the transistor to the energizing signal input of the cathode driver so that in the conducting state of the switch with the display segment ignited a base current flows that is equal to the display current of the display segment divided by the current gain of the transistor and, if the display segment does not ignite, a base current flows which is approximately equal to the desired display current.

10. A gas discharge display arrangement as claimed in claim 8 or 9, wherein the measuring circuit is a part of the error detection circuit and comprises a transistor having an emitter coupled to the energizing signal inputs of a plurality of cathode drivers, a base connected to a setting signal input of the display arrangement for an electric setting signal and a collector coupled to a terminal for connection to a supply source and to the measuring signal output of the measuring circuit, the measuring circuit in operation supplying a measuring signal in response to at least one energizing signal input of a cathode driver drawing a base current which is substantially equal to a desired display current.

11. A gas discharge display arrangement as claimed in claim 1, wherein the cathode drivers and the error detection circuit form part of one or more integrated circuits.

12. A display system comprising a plurality of multi-segmented gas discharge symbol display elements each having a common anode and a plurality of separate cathode segments, a terminal for connection to a source of cathode supply voltage, a plurality of cathode drivers coupling the cathode segments to said terminal, a selection circuit having a plurality of selection output terminals coupled respectively to individual selection input terminals of the cathode drivers, an error detection circuit having an error signal output terminal and a measuring circuit having a plurality of energizing signal output terminals and a measuring signal output terminal, means individually coupling said energizing signal output terminals to respective energizing signal input terminals of the cathode drivers whereby the amplitude of an energizing signal at a selected cathode display segment is a function of the current through said display segment, and means coupling the measuring signal output terminal to the error signal output terminal so that the amplitude of an output signal of the measuring circuit is determined by the sum of the amplitudes of the energizing signals supplied by the measuring circuit to the cathode drivers.

13. A display system as claimed in claim 12 wherein the error detection circuit further comprises a comparison circuit having a first plurality of input terminals individually coupled to respective cathode display segments and a second plurality of input terminals individually coupled to respective selection input terminals of the cathode drivers, the comparison circuit also having a comparison signal output terminal, and means coupling the comparison signal output terminal to said error signal output terminal.

* * * * *